(12) United States Patent
Liao et al.

(10) Patent No.: US 10,317,316 B2
(45) Date of Patent: Jun. 11, 2019

(54) TURBINE INSPECTION STOPPER

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

( * ) Notice: Subject to any disclaimer, the term of this patent is extended or adjusted under 35 U.S.C. 154(b) by 153 days.

(21) Appl. No.: 15/593,884

(22) Filed: May 12, 2017

(65) Prior Publication Data

US 2017/0336280 A1   Nov. 23, 2017

(30) Foreign Application Priority Data

May 19, 2016  (TW) .............................. 105207332 U

(51) Int. Cl.
  *G01M 15/14*  (2006.01)
  *G01M 3/02*  (2006.01)
  *G01M 3/26*  (2006.01)
(52) U.S. Cl.
  CPC ............ *G01M 15/14* (2013.01); *G01M 3/022* (2013.01); *G01M 3/025* (2013.01); *G01M 3/26* (2013.01)
(58) Field of Classification Search
  CPC ...... G01M 3/022; G01M 3/025; G01M 15/14; G01L 19/14; G01L 19/147
  USPC ........................................ 73/37, 49.8, 112.01
  See application file for complete search history.

(56) References Cited

U.S. PATENT DOCUMENTS

| 3,210,997 A | * | 10/1965 | Henning | ............... | G01F 1/1155 |
| | | | | | 73/861.92 |
| 2010/0217541 A1 | * | 8/2010 | West | .................... | F01D 21/003 |
| | | | | | 702/50 |
| 2014/0144221 A1 | * | 5/2014 | Malone | ................. | G01M 3/025 |
| | | | | | 73/114.77 |

* cited by examiner

*Primary Examiner* — Benjamin R Schmitt
(74) *Attorney, Agent, or Firm* — Muncy, Geissler, Olds & Lowe, P.C.

(57) ABSTRACT

A turbine inspection stopper is provided, including a main body and a pressure gauge. The main body has a base portion, an annular flange which is laterally disposed around the base portion and an air passage, the annular flange is for being connected to one of two ends of a turbine, the base portion and the annular flange define an interior space, the interior space is for communicating with an interior of the turbine, and the air passage is for communicating with outside and the interior of the turbine; and at least one part of the pressure gauge is buried in the main body and communicates with the interior space.

7 Claims, 6 Drawing Sheets

TURBINE INSPECTION STOPPER

BACKGROUND OF THE INVENTION

Field of the Invention

The present invention relates to a turbine inspection stopper.

Description of the Prior Art

Generally, to measure an air pressure in a flexible tub of a turbine, or to inspect whether there are leaks, a stopper is needed to be arranged on openings of two ends of the turbine to make an interior of the turbine be a closed space. Then, the turbine is inspected through vacuumizing the interior of the turbine or guiding air into the interior of the turbine.

However, in the prior art, the stopper is often used to plug the openings of the turbine, so the industry does not further design or improve a structure of the stopper. The traditional stoppers are mostly solid tube plugs which are material-wasting and heavy, and it is hard for a user to move the stoppers around. In addition, the stoppers are unable to vary flexibly due to the solid structures, and when the stoppers are engaged with the turbine, there may be unexpected abrasion.

The present invention has arisen to mitigate and/or obviate the afore-described disadvantages.

SUMMARY OF THE INVENTION

The major object of the present invention is to provide a turbine inspection stopper, which can effectively reduce a weight of a stopper so that a user can assemble or disassemble the stopper more smoothly and can prevent the stopper from abrading with a turbine so as to prolong a service life of the stopper and the turbine.

To achieve the above and other objects, a turbine inspection stopper is provided, including a main body and a pressure gauge. The main body has a base portion, an annular flange which is laterally disposed around the base portion and an air passage, the annular flange is for being connected to one of two ends of a turbine, the base portion and the annular flange define an interior space, the interior space is for communicating with an interior of the turbine, and the air passage is for communicating with outside and the interior of the turbine; and at least one part of the pressure gauge is buried in the main body and communicates with the interior space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
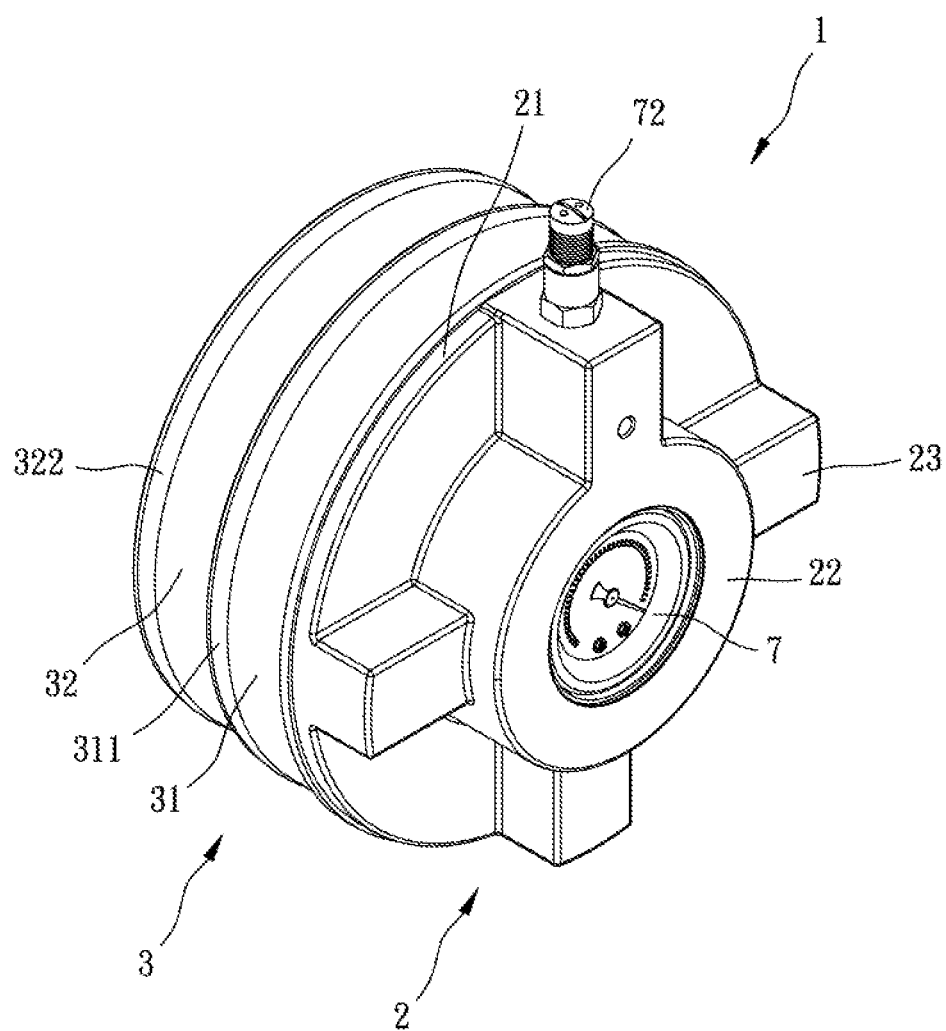
FIG. 1 is a stereogram of a preferred embodiment of the present invention.
Figure 2:
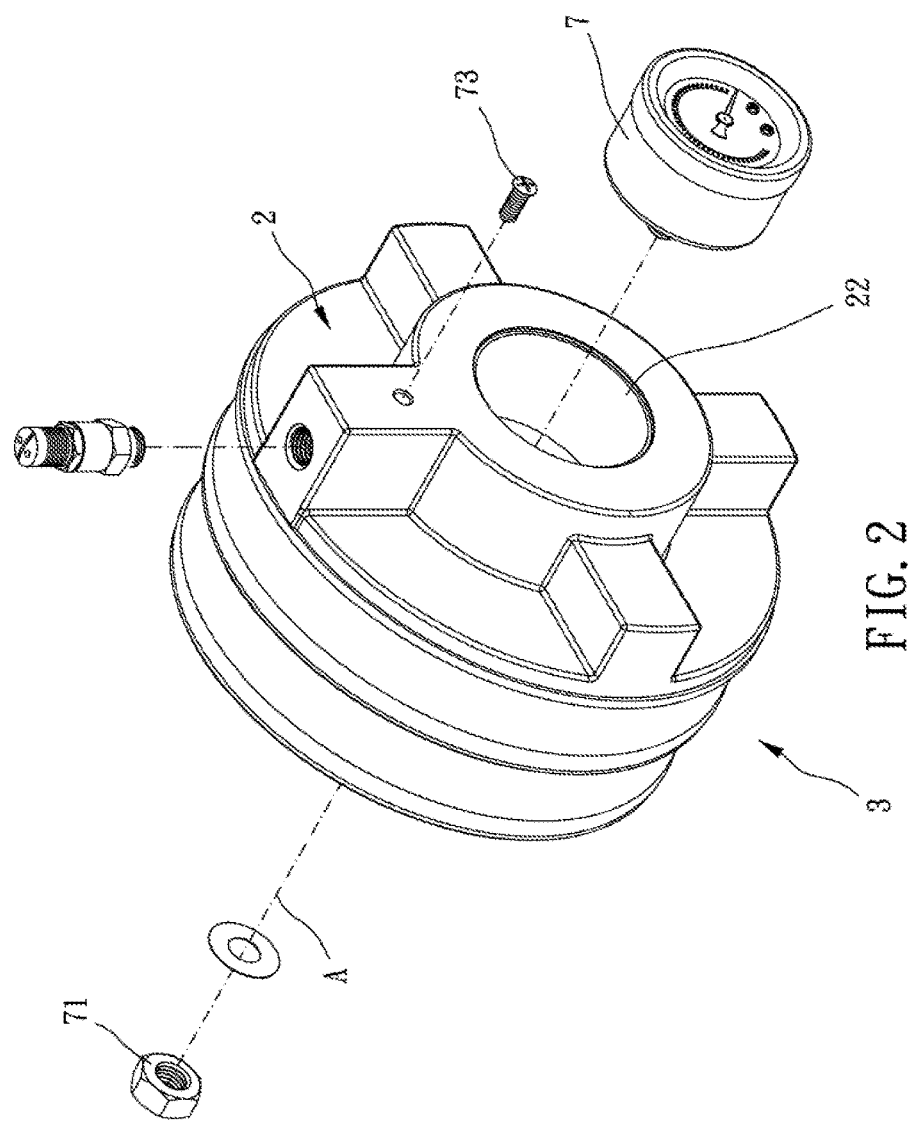
FIG. 2 is a breakdown view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A turbine inspection stopper includes a main body 1 and a pressure gauge 7.

The main body 1 has a base portion 2, an annular flange 3 which is laterally disposed around the base portion 2 and an air passage 4, the annular flange 3 is for being connected to one of two ends of a turbine B, the base portion 2 and the annular flange 3 define an interior space 5, the interior space 5 is for communicating with an interior of the turbine B, the air passage 4 is for communicating with outside and the interior of the turbine B; and at least one part of the pressure gauge 7 is buried in the main body 1 and communicates with the interior space 5. Through a structure of the interior space 5, an overall weight of the turbine inspection stopper can be reduced, and it is more convenient for a user to take and operate the turbine inspection stopper. In addition, the interior space 5 provides a margin for deformation so that when the annular flange 3 is engaged with the turbine B can slightly deform to prevent the annular flange 3 and the turbine B from being damaged due to ramming.

Figure 4:
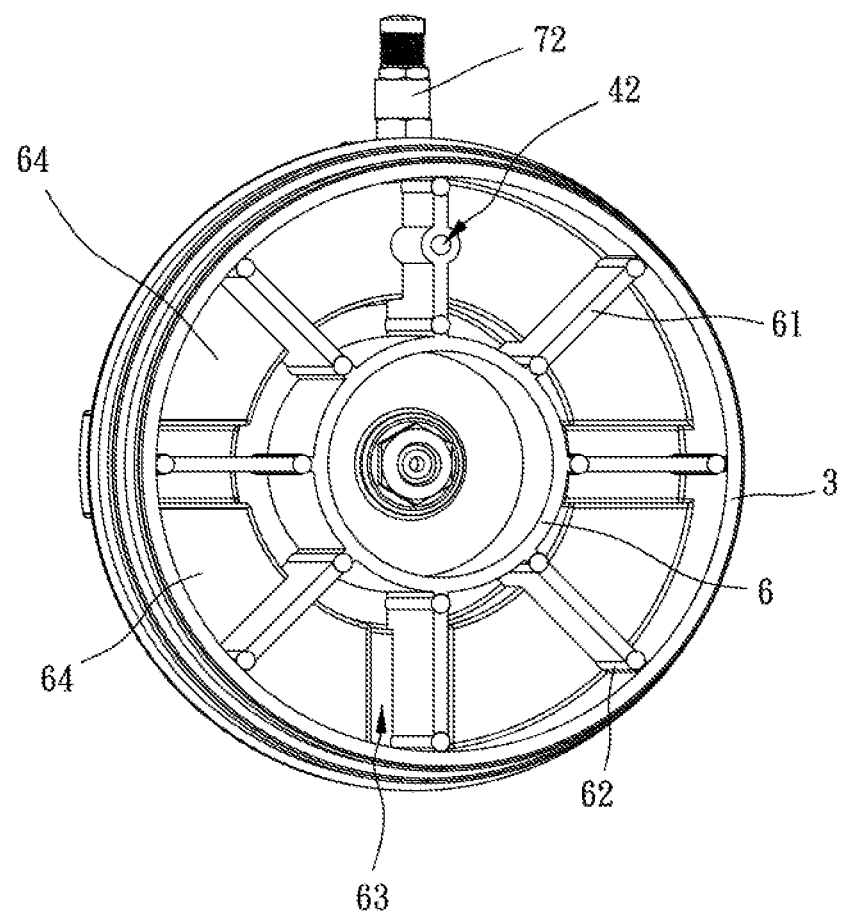
FIG. 4 is another stereogram of the preferred embodiment of the present invention.
Figure 5:
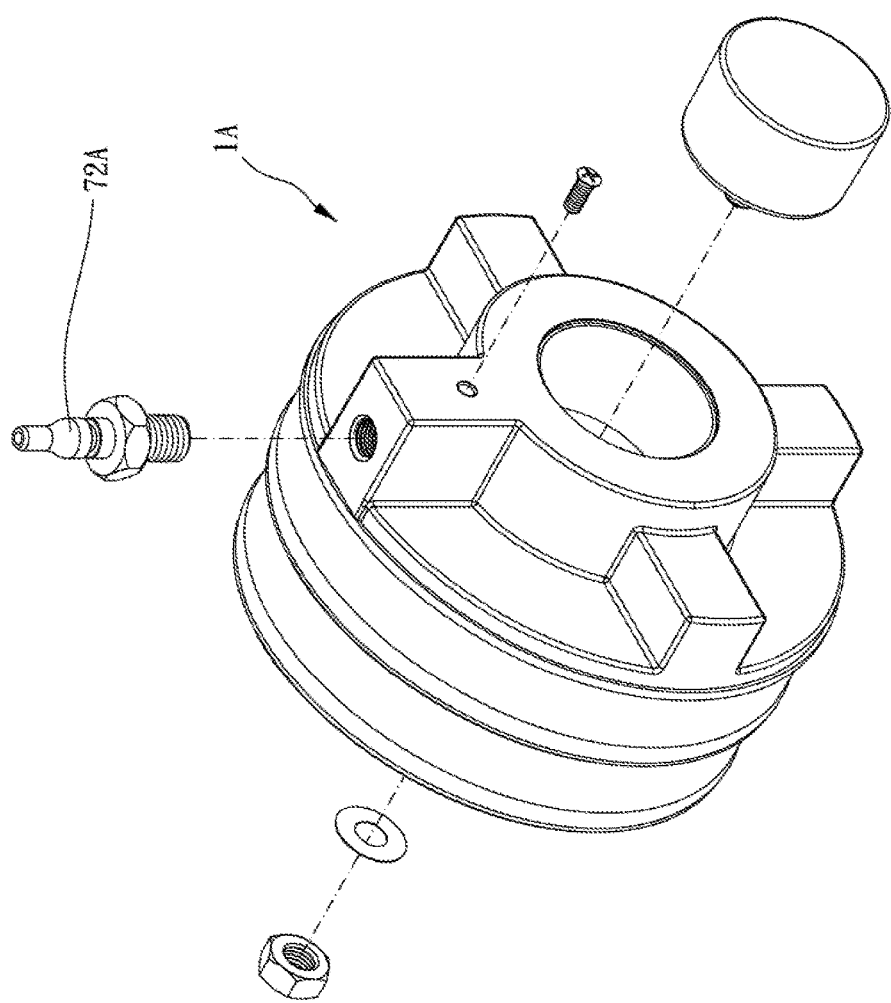
FIG. 5 is a breakdown view of the preferred embodiment of the present invention in another mode.

More specifically, the main body 1 defines a central axis A and further has an axle portion 6 and at least one connecting rib 61, the axle portion 6 is located in the interior space 5 and connected to the base portion 2, each said connecting rib 61 is connected to the axle portion 6 and the annular flange 3 and lateral to the central axis A, and each said connecting rib 61 can strengthen a whole structure to resist greater impact. In this embodiment, the main body 1 has a plurality of said connecting ribs 61, two of said connecting ribs 61, a part of the annular flange 3 and a part of the axle portion 6 define a block 63 (as shown in FIG. 4), each said block 63 has a strengthening portion 64, and each said strengthening portion 64 is connected to at least one of said connecting ribs 61 and the base portion 2 to enhance a structural stability. Preferably, the connecting ribs 61 are equidistantly arranged in the receiving space 5 to evenly distribute weight, a place of each said connecting rib 61 which is near the annular flange 3 and a place of each said connecting rib 61 which is near the axle portion 6 respectively have a reinforcing rib 62; and likewise, the reinforcing rib 62 is used to elevate a strength of the connecting rib 61.

More specifically, the base portion 2 further has a receiving portion 22, the pressure gauge 7 is preferably entirely buried within the receiving portion 22, the receiving portion 22 can block unexpected objects from impacting the pressure gauge 7 directly so as to protect the pressure gauge 7 from being impacted and damaged and to provide preferable operation environment and service life. In this embodiment, a part of the pressure gauge 7 is disposed through the base portion 2 and fixedly engaged with a hexagonal nut 71; in other words, the pressure gauge 7 is detachable, so when a component is damaged, only the damaged part, instead of the whole structure, needs to be replaced. In addition, as viewed along the central axis A, the axle portion 6 is O-shaped, and the receiving portion 22 is O-shaped.

It is to be noted that the base portion 2 further has at least one protrusive rib 23, and each said protrusive rib 23 is connected to an exterior annular wall of the receiving portion 22 and lateral to the central axis A so that the user can clamp or grip on the at least one protrusive rib 23 to drive the main body 1 to move or rotate. Preferably, the main body 1 is integrally formed and has a preferable structural strength. In this embodiment, the base portion 2 has four of said protrusive ribs 23, and the protrusive ribs 23 extend to be substantially cruciform, each said protrusive rib 23 corresponds to one of the connecting ribs 61, and the receiving portion 22 is located at an intersection of the four protrusive ribs 23 (as shown in FIG. 1). In addition, the base portion 2 further has a bottom portion 21 which is round, the receiving portion 22 and the protrusive ribs 23 are connected to one of two sides of the bottom portion 21, the annular flange 3 is connected to the other of the two sides of the bottom portion 21.

The annular flange 3 is substantially cylindrical and coaxially arranged with the main body 1, and the bottom portion 21 is greater than the annular flange 3 in radial dimension. Preferably, the annular flange 3 has a first diameter section 31 and a second diameter section 32, and the first diameter section 31 is connected to the base portion 2 and the second diameter section 32. The first diameter section 31 is greater than the second diameter section 32 in outer diameter, inner diameters of the first and second diameter sections 31, 32 are in the same dimension, and through the different radial dimensions, the annular flange 3 can be adapted to the turbine B which has two different tube diameters. Of course, in other embodiments, the annular flange may be provided with more diameter sections in various dimensions so as to be adapted to more different tube diameters. preferably, a side of the first diameter section 31 which is away from the base portion 2 has a first margin 311, a side of the second diameter section 32 which is away from the base portion 2 has a second margin 322, and the first and second margins 311, 322 are for optionally abutting against an inner wall of the turbine B. The first and second margins 311, 322 can reinforce the engagement with the turbine B so that the main body 1 can be preferably and stably engaged with the turbine B and will not be disassembled from the turbine B due to shaking.

To be more specific about the air passage 4, the air passage 4 has a first flow channel 41 and a second flow channel 42 which communicates with the first flow channel 41, a tool adapter 72 is assembled to the first flow channel 41 for a gaseous fluid to pass therethrough, and the second flow channel 42 is for communicating with the interior of the turbine B. Preferably, the tool adapter 72 is a check valve assembly so that the gaseous fluid can move unidirectionally to input and output the gaseous fluid genuinely.

Figure 6:
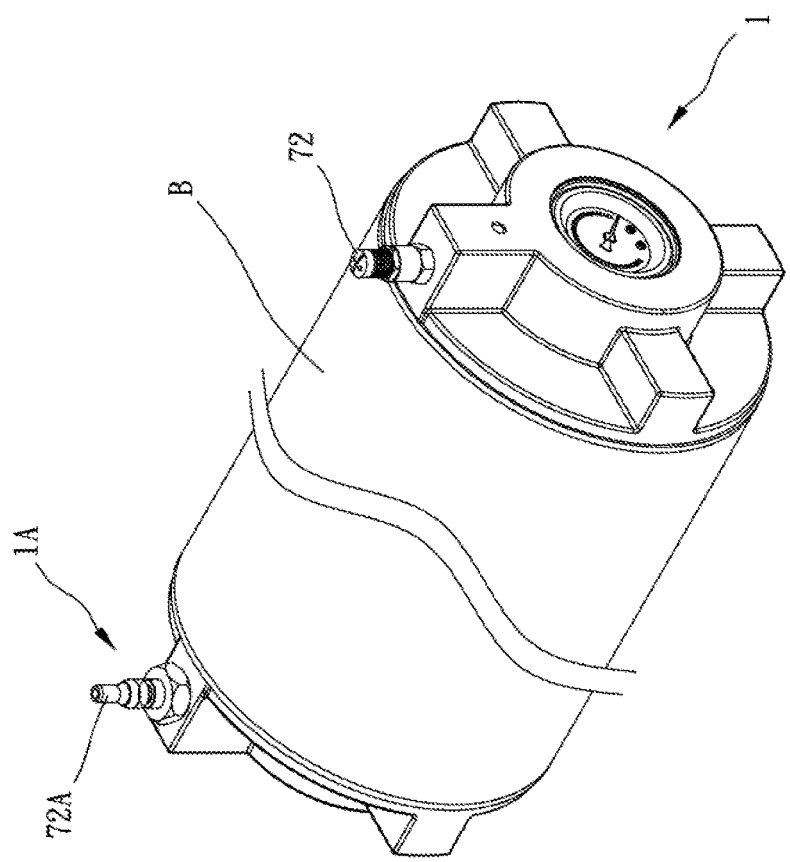
FIG. 6 is a drawing showing the preferred embodiment of the present invention in use.

Specifically, when being inspected, the turbine B inputs and outputs the gaseous fluid, so the tool adapter 72 is either an air input adapter or an air output adapter. Following descriptions are examples only and may be varied in accordance with different requirements in actual practice. For example, in FIGS. 1 to 4, the tool adapter 72 on the main body 1 is the air input adapter, and in FIG. 5, the tool adapter 72 of a main body 1A in another mode is the air output adapter. Therefore, when being inspected, as shown in FIG. 6, one of the two ends of the turbine B is specifically used to exhaust the gaseous fluid in the interior of the turbine B, the other end of the two ends of the turbine B is specifically used to pump the gaseous fluid into the interior of the turbine B, so it is clear to understand how to operate and arrange the tool adapters 72, 72A onto the turbine B. It is understandable that in accordance with different requirements, in other embodiments, the main body may be provided with two types of tool adapters so that the main body can input and output the gaseous fluid.

Figure 3:
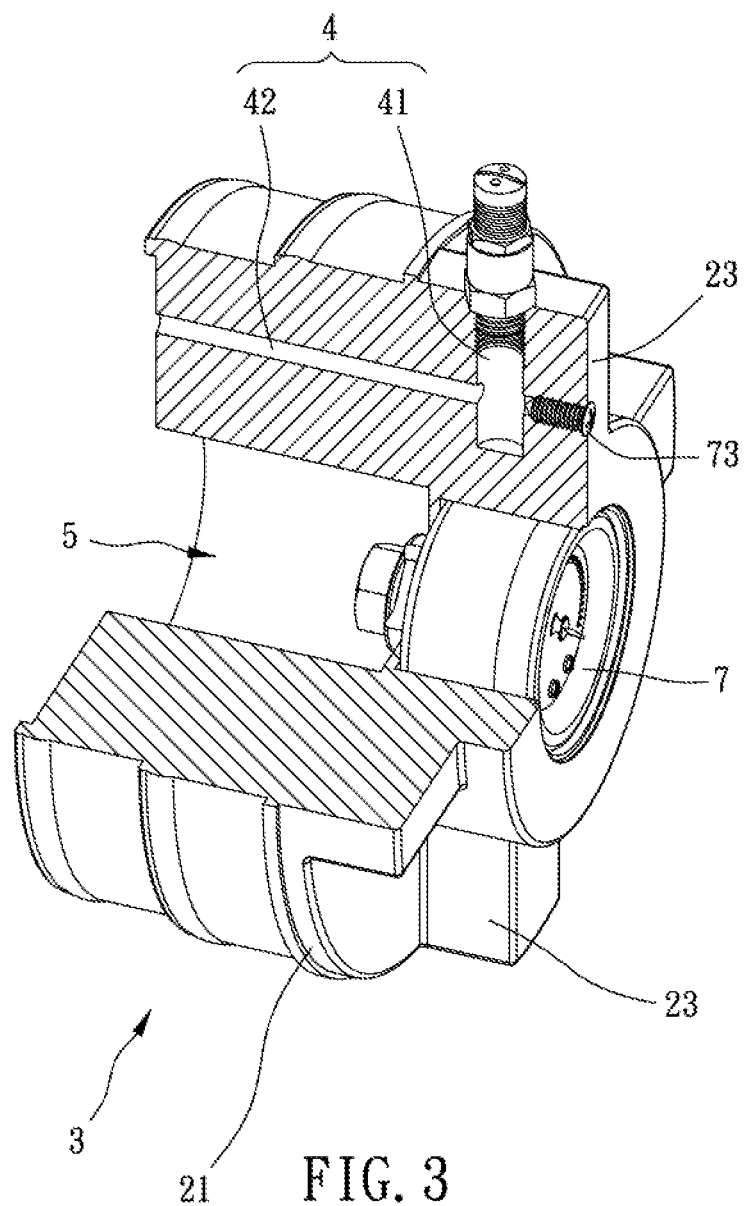
FIG. 3 is a partially cross-sectional view of the preferred embodiment of the present invention.

More specifically, in this embodiment, the first flow channel 41 is perpendicular to the central axis A and penetrates one of said protrusive ribs 23, and the second flow channel 42 is parallel to the central axis A and disposed through one of said connecting ribs 61 and the base portion 2; the first and second flow channels 41, 42 form an L shape; and the first flow channel 41 is greater than the second flow channel 42 in radial dimension. The tool adapter 72 is screwed with the first flow channel 41 for being assembled or disassembled conveniently. In addition, when manufacturing the second flow channel 42, a drill bit drills along the central axis A and through the main body 1, and a through hole which communicates with outside is plugged by a barrier 73 (as shown in FIG. 3).

Given the above, a weight of the turbine inspection stopper can be effectively reduced, and with the at least one protrusive rib, it is easy for the user to grip on and operate the turbine inspection stopper. Furthermore, the connecting rib is further provided to strengthen the whole structure to sustain greater impact.

In addition, through the pressure gauge which is buried in the main body, the user can see the pressure gauge to know a pressure in the interior of the turbine. Since the pressure gauge is buried in the main body, the pressure gauge can be prevented from receiving unexpected impact and being damaged so as to have preferable operation environment and service life.

Furthermore, the annular flange has different diameter sections to be adapted to the turbines having different tube diameter sections, so the user does not need to purchase too many turbine inspection stoppers. There are margins on different tube diameter sections to enhance the engagement and stability of the annular flange and the turbine.

While we have shown and described various embodiments in accordance with the present invention, it should be clear to those skilled in the art that further embodiments may be made without departing from the scope of the present invention.

What is claimed is:

1. A turbine inspection stopper, including:
a main body, having a base portion, an annular flange which is laterally disposed around the base portion and an air passage, the annular flange being connected to one of two ends of a turbine, the base portion and the annular flange defining an interior space, the interior space for communicating with an interior of the turbine, the air passage for communicating with an outside and the interior of the turbine;
a pressure gauge, at least one part thereof being buried in the main body and communicating with the interior space;
wherein the main body defines a central axis and further has an axle portion and at least one connecting rib, the axle portion is located in the interior space and connected to the base portion, and each said connecting rib is connected to the axle portion and the annular flange and lateral to the central axis;
wherein the main body has a plurality of said connecting ribs, two of said connecting ribs, a part of the annular flange and a part of the axle portion define a block, each said block has a strengthening portion, and each said strengthening portion is connected to at least one of said connecting ribs and the base portion.

2. The turbine inspection stopper of claim 1, wherein the air passage has a first flow channel and a second flow channel which communicates with the first flow channel, a tool adapter is assembled to the first flow channel for a gaseous fluid to pass therethrough, and the second flow channel is for communicating with the interior of the turbine.

3. The turbine inspection stopper of claim 2, wherein the tool adapter is a check valve assembly.

4. The turbine inspection stopper of claim 1, wherein the base portion further has a receiving portion, and the pressure gauge is entirely buried within the receiving portion.

5. The turbine inspection stopper of claim 4, wherein the main body defines a central axis, the base portion further has at least one protrusive rib, and each said protrusive rib is connected to an exterior annular wall of the receiving portion and lateral to the central axis.

6. A turbine inspection stopper, including:
a main body, having a base portion, an annular flange which is laterally disposed around the base portion and an air passage, the annular flange being connected to one of two ends of a turbine, the base portion and the annular flange defining an interior space, the interior space for communicating with an interior of the turbine, the air passage for communicating with an outside and the interior of the turbine;
a pressure gauge, at least one part thereof being buried in the main body and communicating with the interior space;
wherein the annular flange and the main body are coaxially arranged, the annular flange has a first diameter section and a second diameter section, the first diameter section is connected to the base portion and the second diameter section, and the first diameter section is greater than the second diameter section in outer diameter;
wherein a side of the first diameter section which is away from the base portion has a first margin, a side of the second diameter section which is away from the base portion has a second margin, and the first and second margins are for optionally abutting against an inner wall of the turbine.

7. The turbine inspection stopper of claim 6, wherein the annular flange is substantially cylindrical, inner diameters of the first and second diameter sections are in the same dimension, the air passage has a first flow channel and a second flow channel which communicates with the first flow channel, a tool adapter is assembled to the first flow channel for a gaseous fluid to pass therethrough, and the second flow channel is for communicating with the interior of the turbine; the tool adapter is a check valve assembly, and the tool adapter is either an air input adapter or an air output adapter; the main body further has an axle portion and at least one connecting rib, the axle portion is located in the interior space and connected to the base portion, and each said connecting rib is connected to the axle portion and the annular flange and lateral to the central axis; the main body has a plurality of said connecting ribs, the connecting ribs are equidistantly arranged in the receiving space, and a place of each said connecting rib which is near the annular flange and a place of each said connecting rib which is near the axle portion respectively have a reinforcing rib; two of said connecting ribs, a part of the annular flange and a part of the axle portion define a block, each said block has a strengthening portion, and each said strengthening portion is connected to at least one of said connecting ribs and the base portion; the base portion further has a receiving portion, and the pressure gauge is entirely buried within the receiving portion; a part of the pressure gauge is disposed through the base portion and fixedly engaged with a hexagonal nut; the base portion further has at least one protrusive rib, and each said protrusive rib is connected to an exterior annular wall of the receiving portion and lateral to the central axis; the base portion has four of said protrusive ribs, the protrusive ribs extend to be substantially cruciform, and the receiving portion is located at an intersection of said protrusive ribs; the base portion further has a bottom portion which is round, the receiving portion and the protrusive ribs are connected to one of two sides of the bottom portion, the annular flange is connected to the other of the two sides of the bottom portion, and the bottom portion is greater than the annular flange in radial dimension; each said protrusive rib corresponds to one of said connecting ribs; as viewed along the central axis, the axle portion is O-shaped, and the receiving portion is O-shaped; the main body is integrally formed; the tool adapter is screwed with the first flow channel; the first flow channel is perpendicular to the central axis and penetrates one said protrusive rib, and the second flow channel is parallel to the central axis and disposed through one of said connecting ribs and the base portion; the first and second flow channels form an L shape; and the first flow channel is greater than the second flow channel in radial dimension.

* * * * *